US009213970B1

(12) United States Patent
Felse et al.

(10) Patent No.: US 9,213,970 B1
(45) Date of Patent: Dec. 15, 2015

(54) PROCESSING OF CO-MINGLED PAPER CORRESPONDENCE

(71) Applicant: Bank of America Corporation, Charlotte, NC (US)

(72) Inventors: Mark D. Felse, Indian Land, SC (US); John B. Hall, Charlotte, NC (US); Michele N. Hanshew, Smyrna, DE (US); Michael J. Pepe, Jr., Wilmington, DE (US); Kerry Kurt Simpkins, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/490,968

(22) Filed: Sep. 19, 2014

(51) Int. Cl.
*G06Q 20/30* (2012.01)
*G06Q 20/24* (2012.01)
*G06Q 20/14* (2012.01)
*G06Q 20/02* (2012.01)
*G06Q 40/02* (2012.01)
*H04N 1/00* (2006.01)
*G06K 9/00* (2006.01)
*G06K 9/18* (2006.01)
*G06Q 20/04* (2012.01)
*G06Q 20/38* (2012.01)
*H04N 1/40* (2006.01)
*G06Q 20/10* (2012.01)

(52) U.S. Cl.
CPC .......... *G06Q 20/30* (2013.01); *G06K 9/00536* (2013.01); *G06K 9/18* (2013.01); *G06K 9/186* (2013.01); *G06Q 20/02* (2013.01); *G06Q 20/042* (2013.01); *G06Q 20/102* (2013.01); *G06Q 20/14* (2013.01); *G06Q 20/24* (2013.01); *G06Q 20/387* (2013.01); *G06Q 40/02* (2013.01); *H04N 1/0032* (2013.01); *H04N 1/0061* (2013.01); *H04N 1/00241* (2013.01); *H04N 1/00331* (2013.01); *H04N 1/00334* (2013.01); *H04N 1/00588* (2013.01); *H04N 1/40062* (2013.01); *H04N 2201/0081* (2013.01)

(58) Field of Classification Search
None
See application file for complete search history.

(56) References Cited

U.S. PATENT DOCUMENTS

| 5,689,579 | A  | * | 11/1997 | Josephson | G06Q 20/042 705/45 |
| 6,038,553 | A  | * | 3/2000  | Hyde, Jr. | G06Q 20/042 705/43 |
| 6,450,403 | B1 | * | 9/2002  | Martens | G06Q 20/042 235/379 |
| 7,426,291 | B2 | * | 9/2008  | Okamura | G06K 9/38 382/137 |
| 8,615,124 | B2 | * | 12/2013 | Faulkner | G06K 9/036 358/301 |
| 8,708,227 | B1 | * | 4/2014  | Oakes, III | G06Q 20/042 705/45 |
| 2001/0039534 | A1 | * | 11/2001 | Keene | G06Q 20/042 705/45 |
| 2006/0279769 | A1 | * | 12/2006 | Ludwig | G06F 21/608 358/1.15 |
| 2013/0212008 | A1 | * | 8/2013  | Edwards | G06Q 20/381 705/39 |
| 2014/0072201 | A1 | * | 3/2014  | Tilt | H04N 1/00137 382/140 |

\* cited by examiner

*Primary Examiner* — Scott A Rogers
(74) *Attorney, Agent, or Firm* — Weiss & Arons LLP; Michael A. Springs, Esq.

(57) ABSTRACT

Aspects of the disclosure relate to providing apparatus and methods for processing co-mingled paper correspondence received at a central location. Apparatus and methods provide an ability to co-mingle paper correspondence and corresponding digital images of the paper correspondence. Apparatus and methods provide an ability to translate transaction information extracted from the co-mingled correspondence to a payment time. Apparatus and methods provide may utilize custom scan templates to improve a reliability and accuracy of information extracted from co-mingled correspondence.

21 Claims, 10 Drawing Sheets

DEFAULT SCAN TEMPLATE

| Target Area | Item No. (FIG. 6) | Extracted Information |
|---|---|---|
| QR Code | 601 | Residential Mortgage Statement |
| MICR Line | 603 | 0300  12345671000 00028500 00028500 7 |
| Correspondence Code | 605 | 0300 |
| Customer Account No. | 607 | 1234567 |
| Product Code | 609 | 1000 |
| Payment Amount No. 1 | 611 | 00028500 |
| Payment Amount No. 2 | 613 | 00028500 |
| Statement No. | 615 | 7 |
| Scan Line | 617 | ABC Capital Somewhere, US 12345 |

FIG. 7A

SPECIALIZED SCAN TEMPLATE #1

| Target Area | Item No. (FIG. 6) | Extracted Information |
|---|---|---|
| MICR Line | 603 | 0300 1234567 1000 00028500 00028500 7 |
| Scan Line | 617 | ABC Capital Somewhere, US 12345 |
| Total Amount Due | 619 / 629 | $285.00 |
| Customer Account No. | 621 | 1234567 |
| Due Date | 623 | 09/06/2014 |
| Entity Address | 625 | ABC Capital Somewhere, US 12345 |
| Entity Name | 627 | ABC Capital |

FIG. 7B

SPECIALIZED SCAN TEMPLATE #2

| Target Area | Item No. (FIG. 6) | Extracted Information |
|---|---|---|
| Additional Payment | 631 | $26.30 |
| Total Amount Enclosed | 633 | $311.30 |
| Automatic Payments Checkbox | 635 | <DO_NOT_ENROLL> |

FIG. 7C

900 — 902 Check Number | 904 Account Identifier | 906 Payee | 908 Payee Family | 910 Check Date | 912 Check Amount | 914 Dollars | 916 Comment | 918 Comment Family | 920 Signature Party | 922 Scan Location | 923 Machine Readable Identifier

FIG. 9

PROCESSING OF CO-MINGLED PAPER CORRESPONDENCE

FIELD OF TECHNOLOGY

Aspects of the disclosure relate to providing apparatus and methods for processing co-mingled paper correspondence received at a central location.

BACKGROUND

Entities, such as financial institutions, may offer products or services (hereinafter, "product") to customers. The entity may transmit correspondence to customers. The correspondence may be transmitted to the customers using any suitable methods. The entity may transmit the correspondence via email, fax, or mail. The correspondence may inform the customer that, as a result of utilizing the product, a fee is due to the entity. For example, the entity may extend an amount of credit to the customer. After a period of time, the entity may transmit correspondence informing the customer that at least a partial payment of the credit amount is due.

The correspondence may include identification information. For example, the correspondence may include a customer account number assigned by the entity to the customer. The correspondence may include an address of the customer, an amount due, information that identifies the product utilized by the customer, information that identifies the purpose of the correspondence or any other information.

The customer may detach a portion of the correspondence (e.g., a "remit coupon") and return the portion along with a payment. The remit coupon may include the information that identifies the correspondence. An entity may offer multiple products. Each product offered by the entity may be associated with a corresponding remit coupon. An entity may transmit correspondence to hundreds of thousands of customers. The entity may receive hundreds of thousands of remit coupons.

Typically, to handle the volume of remit coupons, the entity may direct remit coupons to different locations. For example, remit coupons associated with credit card payments may be directed to a first location. Remit coupons associated with mortgage payments may be directed to second location. The entity may direct a remit coupon to a specific location by printing the specific location on the remit coupon.

When a remit coupon is received at a location, the remit coupon is processed at the location. Each location may be configured to process correspondence associated with specific product of the entity. The entity may determine when (date/time) the correspondence was received at the location. The customer may be subject to an additional fee if the remit coupon and associated payment are not received by a specified due date. The due date may be printed on the remit coupon. Based on identifying information printed on the remit coupon, the entity may determine whether a payment of an amount due has been received "on time."

A remit coupon may be processed to identify the amount due and the customer account number assigned to the customer. The remit coupon may be accompanied by a payment. The payment may include a check. The check may be handwritten by the customer. The payment may include credit card information. The payment may include a money order. The payment may be any suitable method of payment.

Processing at the location may include analysis of the payment. For example, the payment may be analyzed to determine an amount of the payment. The amount of the payment may be credited to the customer account number as of the time the correspondence is received at the location. The amount of the payment may reduce the amount due included in the remit coupon.

It would be desirable to reduce the number of location for receiving and processing remit coupons. Maintaining different location for receiving remit coupons imposes a burden on the entity. The burden may include costs such as maintaining the location, staffing the location and maintain equipment at the location.

It would be desirable to co-mingle correspondence associated with multiple products offered by an entity. It would be desirable to process the co-mingled correspondence at a central location. Therefore, it would further be desirable to provide apparatus and methods for processing co-mingled correspondence.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIGS. 7A-7C show illustrative results of processing co-mingled correspondence;

FIG. 9 shows an illustrative result of processing co-mingled correspondence.

DETAILED DESCRIPTION OF THE DISCLOSURE

Figure 1:
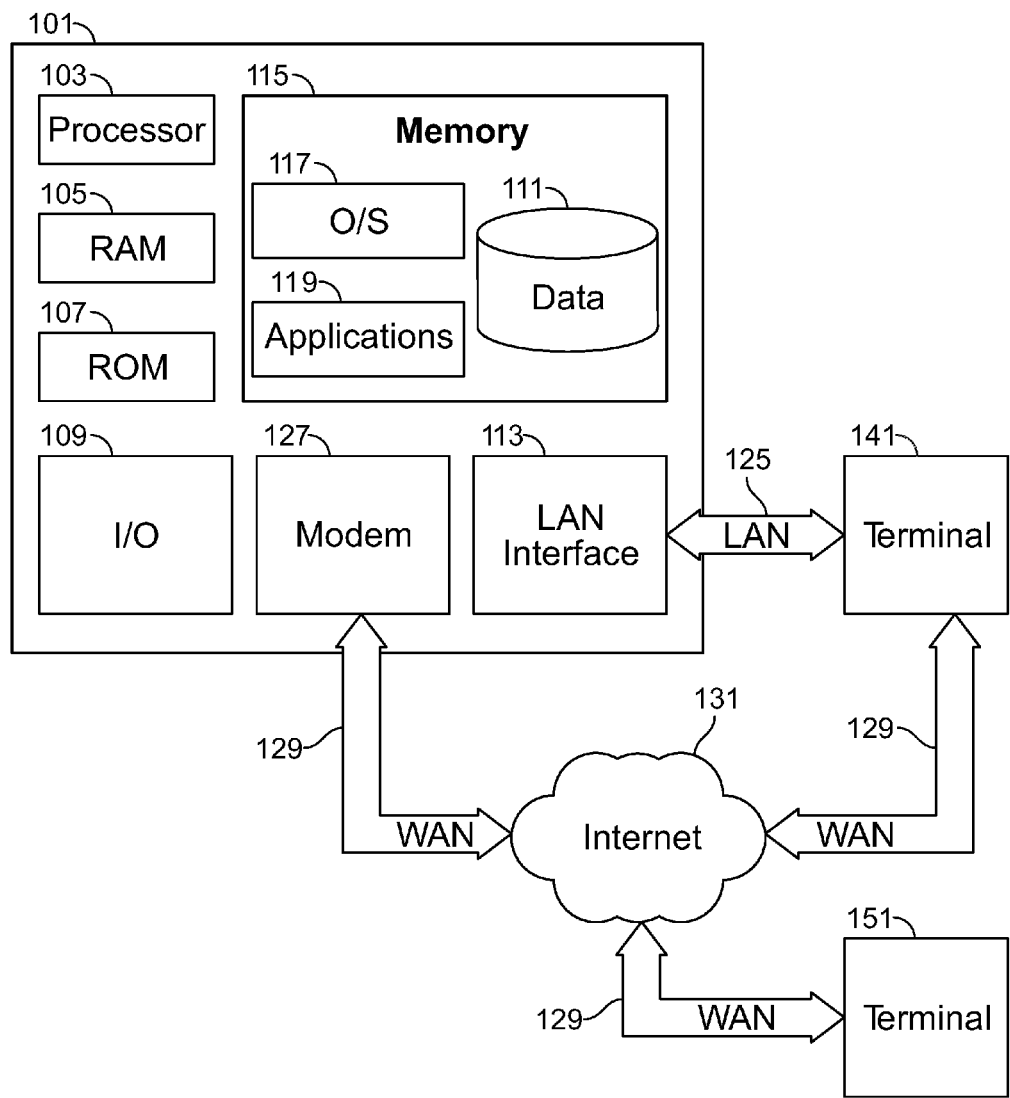
FIG. 1 shows an illustrative apparatus in accordance with the principles of the invention.

Apparatus and methods for processing co-mingled correspondence are provided.

An entity may direct correspondence associated with multiple products to a central location. The correspondence may be co-mingled at the location. Apparatus may digitize the correspondence received at the central location. The apparatus may save each piece of correspondence as a digital image. The digital images may be co-mingled. Co-mingling may include storing a plurality of digital images in one file. Co-mingling may include storing a plurality of digital images received on the same day in one file. Each of the digital images may be associated with a time/date when the correspondence was received at the central location.

The apparatus may analyze the co-mingled digital images. The analysis of a co-mingled image may include associating a default electronic scan template with each co-mingled image. The default scan template may be configured to process co-mingled images associated with multiple products offered by the entity.

Illustrative electronic scan templates described herein may be applied to a paper document and/or a digital image of the document.

An electronic scan template may include computer readable instructions that, when executed by a processor on a computer system, direct the computer system, scanner or other document processing equipment to identify at least one target area within the digital image. A target area may include a portion of the image. A target area may include the entire digital image.

The scan template may direct the computer system, scanner or other document processing equipment to extract information from an identified target area. A default scan template may be configured to extract information from a target area common across different pieces of correspondence issued by the entity.

For example, apparatus may perform a first electronic scan of the co-mingled image using a default or first electronic scan template. The default electronic scan may include instructions for extracting a first set of printed characters from within a co-mingled image. The first scan template may identify a target area within the digital image. A set of characters may be printed in the target area. The scan template may identify the target area based on one or more characteristics of a digital image.

For example, the scan template may identify a target area based on margins or borders of the digital image. The scan template may identify a target area based on historical characteristics of co-mingled correspondence. Analysis of digital images may determine that information identifying the digitized correspondence is typically found within a target area.

Co-mingled correspondence may be associated with different products offered by an entity. Each piece of co-mingled correspondence may each include information printed within a target area. For example, the entity may print magnetic ink character recognition (hereinafter, "MICR") on a remit coupon. The MICR line may be located within a pre-determined target area across multiple pieces of correspondence issued by the entity. The MICR line may be detected during an initial digitization of correspondence. The MICR line may be detected based on a size, font, location or other suitable identifying characteristic.

A first electronic scan template may identify a first target location or area within a co-mingled image. The first target area may identify a MICR line printed on the digitized correspondence. The MICR line information may include a customer account number. The MICR line information may include a payment amount. The payment amount may be an amount that is owed by a customer for products provided by the entity.

The first electronic scan template may identify a second target area within the co-mingled document and/or image. The second location may identify a scan line printed on the digitized correspondence. The scan line may include a customer account number, a payment amount due, customer name or any other suitable information.

The first set of printed characters may include first information extracted from the MICR line located at the first target area. The first set of printed characters may include second information extracted from a scan line located at the second target area.

A co-mingled document and/or image may be classified as being associated with one of a plurality of product types. Each of the plurality of product types may correspond to a product/service provided by the entity. For example, a financial entity may offer mortgage products, credit card products, line-of-credit products or other financial products. The financial entity may offer personal and/or commercial financial products. The financial entity may co-mingle correspondence associated with multiple customers and multiple products at a central location.

The apparatus may select a specialized or second electronic scan template. The second electronic scan template may be selected based on identified product type. The second scan template may be selected based on the first set of printed characters extracted from the co-mingled image.

For example, correspondence associated with a first product, such as a mortgage statement, may be associated with a first format. The first format may control where identifying information is printed on the correspondence. Correspondence associated with a second product, such a credit card statement, may be associated with a second format. The second format may control where identifying information is printed on the correspondence. Correspondence associated with two or more products may share formatting aspects. For example, an entity may typically print a MICR line in the same general target area across multiple products offerings of the entity.

The apparatus may perform a second electronic scan of the co-mingled image using the second scan template. The second electronic scan may extract a second set of printed characters from within each co-mingled image. The second electronic scan of the digital image may include using optical character recognition to extract the first set of printed characters. The second electronic scan template may identify a target area within the co-mingled image. The target area may include the second set of characters. The second scan template may identify the target area based on characteristics of correspondence associated with the identified product.

For example, correspondence associated with a commercial loan product may include characters printed in a first pre-determined target area. Correspondence associated with personal credit card products may include characters printed in a second pre-determined target area. Applying a second scan template that is specialized for correspondence associated with a specific product may increase an accuracy of information extracted from a co-mingled image. Applying a specialized scan template may improve scanning accuracy by at least 10% over using a default scan template.

A specialized scan template may identify target areas within a co-mingled image that are likely to contain desired information. Scanning of the target area may reduce an amount of computing power needed to extract identifying information from the co-mingled image. A scanner may not need to process the entire image to extract information printed on a relatively small portion of the image (i.e., the target area). Reducing computing power required to extract identifying information may be significant when multiplied by an amount of digital images processed by an entity. The entity may have hundreds of thousands of customers. The entity may process and analyze multiple pieces of correspondence received from each of the hundreds of thousands of customers. Even a relatively small reduction in computing power when processing each co-mingled document and/or image may result in significant cost savings for the entity.

Based on a second set of printed characters extracted from the co-mingled document and/or image, apparatus may confirm and/or verify a first set of printed characters extracted from a co-mingled image. For example, a customer account number and a payment amount may be printed in multiple locations on a piece of correspondence. Some locations may be common across multiple types of correspondence issued by the entity. Some locations may be specific to correspondence associated with a specific product offered by the entity.

A first scan template may extract information from common or generic locations. Based on the information extracted from the generic locations, a product associated with the correspondence may be identified. Based on the identified product, a second scan template may be selected. The second scan template may be specially configured to identify the specific locations within the correspondence based on the identified product. Information extracted from the specific locations may be compared to information extracted from the generic locations. The comparison may verify an accuracy of the information extracted from the generic and specific locations.

The comparing may verify an accuracy of a customer account number and a payment amount extracted from a co-mingled image. In response to verifying the customer account number and the payment amount, the apparatus may register a credit of the payment amount to the customer account number. The credit may be registered to the customer account number as of the time and/or date the correspondence was received at a central processing location. The crediting of the payment amount may reduce an amount owed by the customer for a product or service provided by the entity.

For example, the apparatus may be configured to compare the first information extracted from the MICR line to the second information extracted from the scan line. The apparatus may be configured to verify that at least a portion of the first information corresponds to at least a portion of the second information.

The comparing may verify that the MICR line and the scan line both include an identical customer account number. The comparing may increase a likelihood that that co-mingled correspondence is correctly identified. The comparing may increase a likelihood that that information extracted from a digital image of co-mingled correspondence is accurate. An ability to accurately extract information for a digital image of co-mingled correspondence may determine a feasibility of co-mingling correspondence associated with different products.

Apparatus may classify a co-mingled digital image as the one of a plurality of products based on the identical customer account number.

In response to a failure of the second set of extracted characters to verify the first set of extracted characters, the apparatus may be configured to determine whether the first set of extracted characters or the second set of extracted characters comprises a valid customer account number. A valid customer account number may be detected within either the MICR line, the scan line or within any suitable target area of a co-mingled image.

In response to detecting a valid customer account number, apparatus may classify a co-mingled image as the one of the plurality of products. The valid customer account number may be linked to a record that indicates which of the plurality of products is associate with the co-mingled image.

A customer account number may be "valid" when a format of the extracted customer account number conforms to a pre-determined format. A customer account number may be valid when the extracted customer account number is associated with a customer account. A customer account number may be valid when the extracted customer account number is record of transaction activity for the customer account number.

Apparatus may determine whether a valid customer account number is associated with a threshold number of payments corresponding to the payment amount. Using the customer account number, the apparatus may be configured access a record that stores historical payments associated with the customer account number. In response to detecting a threshold number of payments, the apparatus may register a credit of the payment amount to the valid customer account number. The threshold number of payment may verify an accuracy of an extracted customer account number.

Apparatus may be unable to classify a co-mingled image as being associated with at least one of a plurality of products offered by the entity. For example, the apparatus may be unable to verify that the MICR line and the scan line both include an identical customer account number. In such scenarios, the co-mingled image may be flagged for special processing.

Special processing may include displaying the co-mingled image and/or information extracted from the co-mingled image. For example, a customer account number extracted from the MICR line may be displayed alongside a customer account number extracted from the scan line. The apparatus may display the digital image and request a selection of which version of the customer account number is displayed on the digital image. Special processing may include reapplying the first electronic scan template to the digital image.

In some embodiments, in response to a failure to classify the co-mingled image as the one of the plurality of products, the co-mingled image may be classified as a check or other type of customer generated correspondence. Examples of customer produced correspondence may include a note, a money order or a check.

In response to classifying the co-mingled image as a check or other customer generated correspondence, the apparatus may select a third electronic scan template. The third electron scan template may be specialized for extracting information form customer generated correspondence. The apparatus may perform a third electronic scan of the co-mingled image using the third electronic scan template. The third electronic scan may attempt to decipher alphanumeric characters printed on the check or other customer generated correspondence. The alphanumeric characters may be handwritten on the check or other customer generated correspondence.

The third electronic scan template may extract at least a portion of a customer account number. For example, a customer account number may be handwritten on a check or other customer generated correspondence. The third electronic scan may decipher at least a portion of the customer account number printed on the check. Based on the deciphered portion of the customer account number, the apparatus may classify the co-mingled image. For example, mortgage products offered by an entity may include a sequence of characters. The deciphered portion of the customer account number may include the sequence of characters. In response to detection of the sequence, the apparatus may associate the co-mingled image with a product offering.

In response to associating a co-mingled image with at least one of the plurality of products, the apparatus may receive a target area of the co-mingled image. The target area may be associated with the one of the plurality of products. For example, the target area may identify a portion of the image that includes desired information. The desired information may be used to verify information extracted from other areas of the co-mingled image.

The apparatus may identify characters within a target area of a co-mingled image using an electronic scan template. For example, the third electronic scan template may be configured to decipher handwritten characters within a target area. The third electronic scan template may be configured to identify, within a target area, characters printed in a variety of fonts.

Methods for processing of co-mingled correspondence are provided. Methods may include co-mingled correspondence received from customers of an entity at a central location. The methods may include utilizing machinery configured to process correspondence received at the central location.

Illustrative machinery may include Eagle remittance processing devices and scanners manufactured by Opex Corporation of Moorestown, N.J. Illustrative devices may include the Opex Eagle line of devices and/or Opex 3290, 3690 and/or 7200 devices. Opex machinery may be programmed to perform the methods and functionality disclosed herein. Illustrative machinery may include conveyor belts, rollers or other hardware for orienting the paper correspondence. Illustrative machinery may include a scanner for generating digital images of the paper correspondence. The scanner and associated computer hardware may extract and/or interpret information printing on the paper correspondence or included within a digital image.

Co-mingled correspondence may be one of multiple pieces of correspondence received at a designated location. The multiple pieces of correspondence may be associated with remittance for use of different products offered by the entity.

A customer may mail a document associated with the remittance to a central location in an envelope. The methods may include removing the document from an envelope. The document may be removed from the envelope at the central location. The method may include orienting the document. The methods may include generating a digital image of the document. When the document is oriented in pre-determined fashion, target areas associated with a scan template may identify desired information within the digital image. Multiple remittance documents may be co-mingled at the central location. Multiple digital images may be co-mingled at the central location.

Methods may include applying a first or default scan template to a co-mingled document. The first scan template may be configured to extract MICR line information printed on the document. A location of MICR line information may be detected based on sensing a presence of magnetic ink on the document. The location of MICR line information may be detected based on a customary position of MICR line information on documents produced by the entity. The first scan template may be applied to a co-mingled digital image.

The first scan template may be configured to extract scan line information printed on the document. A location of scan line information may be detected based on scanning the document for machine readable markings. The location of scan line information may be detected based on a customary position of MICR line information on documents produced by the entity. The location of the MICR line information may be a reference point used to identify other target areas on a co-mingled document.

Extracted MICR line information and/or extracted scan line information may identify an entity product associated with a co-mingled document. The extracted MICR line information and/or the extracted scan line information may identify a customer account number. The customer account number may identify an entity product associated with the co-mingled document.

Based on the entity product, the methods may associate the document with a second scan template. The second scan template may be a specialized scan template. The methods may include applying the second scan template to the digital image of the co-mingled document. The second scan template may be configured to extract a customer name, a payment amount, a customer account number, MICR line information and/or scan line information printed on the co-mingled document. Thus, methods may include obtaining at least two reading of the MICR line and scan line information.

Methods may include calculating a confidence score for each co-mingled digital image. The confidence score may be calculated based on correlating information extracted using the first scan template to information extracted using the second scan template to the document. For example, a result of a first scanning of a MICR line may be compared a result of a second scanning of the MICR line. When both scan results correspond, the confidence score may be higher than if the results differ.

The methods may include registering a credit of an extracted payment amount to the customer account number. The credit may be registered to the customer account number when the confidence score exceeds a threshold score.

A confidence score may be determined based on calculating a plurality of "sub" scores. For example, a first sub score may be calculated based on comparing MICR line information extracted using a first scan template to MICR line information extracted using a second scan template. A second sub score may be calculated based on comparing MICR line information extracted using the first scan template to a customer account number extracted using a second scan template. The customer account number may be extracted from a different target area from the MICR line information.

A third sub score may be calculated based on comparing scan line information extracted using a first scan template to scan line information extracted using a second scan template. A fourth sub score may be calculated based on comparing scan line information extracted using the first scan template to a customer account number extracted using the second scan template. A fifth sub score may be calculated based on determining whether an extracted customer name is associated with an extracted customer account number. Any suitable number of sub scores may be calculated.

Each sub score may be calculated using any suitable information extracted from a digital image of a co-mingled document. Each sub score may verify information extracted from the digital image. Illustrative extracted information and illustrative verifications are shown below in Table 1.

Methods may include measuring dimensions of an envelope that contained a co-mingled document. The methods may include determining, based on measured dimensions of the envelope, whether the co-mingled document is an entity-issued document or a non-entity-issued document. Different specialized scanning templates may be applied to different co-mingled documents. Each scanning template may be optimized to accurately extract information from the co-mingled document being analyzed. A specialized scanning template may be selected based on information extracted during scan of the co-mingled document using a default scan template.

Co-mingled documents received at a central location may include documents issued by an entity. An entity-issued document may include a remittance coupon transmitted by the entity to a customer. The customer may return the remittance coupon to the entity along with a payment or payment information.

Methods of processing a co-mingled document may include evaluating whether the co-mingled document received at the central location is an entity-issued document or a non-entity-issued document.

A customer may transmit a non-entity-issued document to a central location. For example, the entity may mail a customer a bill for products provided by the entity. The customer may mail a check, money order, credit card number or other form of payment to the central location. The customer may mail a note explaining a partial payment or a non-payment. The non-entity-issued correspondence may be any correspondence that has not been supplied by the entity.

The entity may use automated methods to analyze the check and extract information printed on the check. Based on the extracted information, the entity may determine a customer account number and a payment amount. The entity may verify the customer account number and payment amount based on information extracted from the non-entity-issued document. The entity may credit the payment amount to the customer account number.

Specialized scan templates may be designed and applied to extract information from a non-entity-issued document. For example, non-entity-documents may include handwritten characters. A specialized scan template may be configured to decipher the handwritten characters.

Methods may include differentiating between entity-issued and non-entity-issued documents based on measuring dimensions of a document. A non-entity-issued document may be detected by measuring one or more dimensions of the correspondence received at the location. Methods may include detecting a non-entity-issued documents based on measuring dimensions of envelope that contained the document. For example, the entity may measure weight, thickness, length and/or width of a received document or envelope. Dimensions may be measured before and after extracting the document from the envelope. The entity may employ a specialized device, such an Opex Eagle device, to measure dimensions.

When a co-mingled document is determined to be an entity-issued document, two or more scan templates may be applied to the document. The two or more scan templates may be configured to identify target areas on the entity-issued document. The two or more scan templates may extract information from the target areas. For example, the methods may include extracting MICR line information from a first target area. The methods may include extracting scan line information from a second target area.

Information extracted by a first of the scan templates may be verified by information extracted from a second of the scan templates. The verifying may include comparing the information extracted by the first scan template to the information extracted by the second scan template. The verifying may include determining whether information extracted by the first scan template and information extracted by the second scan template are both associated with one customer account number.

For example, methods may include verifying that MICR line information extracted using a second scan template corresponds to MICR line information extracted using a first scan template. Methods may include verifying that scan line information extracted from a target area corresponds to the scan line information extracted as a result of applying a first scan template to the same target area.

Table 1 shows illustrative information that may extracted from a digital image of a co-mingled document. Information in each row of Table 1 may be used to verify information in any other row of Table 1.

TABLE 1

Illustrative extracted information and verification relationships associated with the extracted information.

| Row No. | Target area | Information Type | Illustrative Verification Relationships |
|---|---|---|---|
| 1. | MICR Line | Customer Account No. Payment Amount Correspondence Identifier Product Identifier | Rows 2, 3, 6, 8 |
| 2. | Scan Line | Customer Account No. Payment Amount Correspondence Identifier Product Identifier Customer Address Entity Location Address | Rows 1, 3, 4, 5, 6, 7, 8 |
| 3. | Payment Due Block | Customer Account No. Payment Amount Due Balance Forward Actual Payment Amount Additional Payment Due Date | Rows 1, 2, 6, 8 |
| 4. | Entity Location Block | Entity Name Location Address | Rows 1, 2, 6, 8 |
| 5. | Customer Address Block | Customer Name Customer Address | Rows 1, 2, 7 |
| 6. | "Pay-To-The-Order-Of" Segment | Entity Name | Rows 1, 2, 4 |
| 7. | "Customer Name" Segment | Customer Name Customer Address | Rows 1, 2, 5 |
| 8. | "Amount" Segment | Actual Payment Amount | Rows 1, 2, 3 |

In response to detection of a non-entity-issued document the entity may digitize the non-entity-issued document. The entity may apply a third scan template to the digital image of the document. The third scan template may be a specialized scan template configured to extract information from a non-entity-issued document.

The third scan template may be configured to identify one or more target areas within a co-mingled image of a non-entity-issued document. The methods may include extracting information printed on the document within the target area of the digital image.

For example, the dimensions of a non-entity-issued document may correspond to dimensions typically characteristic of a personal check. The third scan template may be configured to identify locations on the check that typically include desired information. Desired information may include a customer name, customer address, customer phone number, check number, payment amount (printed in words and/or numbers), a drawee bank identifier, bank account number and/or a customer signature.

The third scan template may be configured to decipher handwritten characters. For example, a customer may handwrite an entity issued customer account number on the check or other non-entity-issued document. The third scan template may be configured to decipher and extract the handwritten characters.

For example, the methods may include using the third scan template to extract, from a co-mingled document (digital image or paper copy): a customer name, a payment amount and at least a portion of a bank account number printed on the document. Methods may include verifying that the extracted customer name is associated with the extracted portion of the bank account number. The methods may include determining a customer account number. The customer account number may be determined based on an extracted portion of the bank account number.

For example, a specialized scan template may extract a string of alphanumeric characters. The string may be compared to a plurality of bank account numbers. The comparing may determine if the string includes at least a portion of a bank account number. The searched plurality of bank account number may be limited to bank account numbers that are in use by customers of an entity. The searched plurality of bank account number may be limited to bank account numbers that allow a withdrawal of funds.

An extracted alphanumeric string may include a partial customer account number. The methods may include determining a complete customer account number. The complete customer account number may include the string. The complete customer account number may be verified by determining that one or more other pieces of extracted information are associated with the complete customer account number.

For example, verifying the complete customer account number may include determining that the complete number is associated with an extracted customer name. The methods may include verifying that the complete account number is associated with a record of a threshold number of payments corresponding to a payment amount extracted from the co-mingled document. The threshold number of payments may include payment amounts received by the entity that are each within a pre-determined percentage of an extracted payment amount. The threshold number of payments may include payment amounts received by the entity that are each within a pre-determined absolute value of an extracted payment amount.

The methods may include registering a credit of an extracted payment amount to a complete customer account number. The credit may be registered to the complete account number when the complete customer account number is successfully verified as being associated with other information extracted from a co-mingled document.

Verifying may include locating an entity record that is associated with: the extracted customer name, the extracted payment amount and the extracted portion of the bank account number. The verifying may include locating a record that includes the information extracted using any suitable scan template. In some embodiments, the methods may include locating two or more records that include information extracted from a co-mingled document.

When two or more records are associated with information extracted from a co-mingled document, the methods may include extracting additional information. Extracting the additional information may include applying or reapplying a scanning template to the co-mingled image and/or document. The additional information may differentiate between the two or more records. In some embodiments, the two or more records may be displayed alongside the image of the received document.

In response to verifying information extracted from a co-mingled image and/or document, the methods may include for the non-entity-issued document, registering a credit of payment amount to a customer account number. The payment amount and/or customer account number may be extracted from a digital image of the document. The payment amount and/or customer account number may be determined based on information extracted from the digital image.

Documents received at a central location may be contained in an envelope or other suitable packaging. The methods may include generating a digital image of an envelope received at the central location. The digital image of the envelope may include address information, shipping information or any other suitable information printed on an exterior of the envelope. The methods may include extracting information from the digital image of the envelope. The methods may include verifying a customer account number extracted from the document based, at least in part, on the information extracted from the digital image of the envelope.

Methods may include generating a list of customer account numbers. Methods may include generating a list of payment amounts. One or more of the lists may be generated based on information extracted by the first scan template and/or the information extracted by the second scan template.

For example, a digital image of a co-mingled document may include a payment amount that is skewed or otherwise unclear. Apparatus and methods may determine a plurality of options that may correspond to the actual payment amount printed on the co-mingled correspondence. Methods may include displaying the one or more lists. Lists may be displayed alongside an option for a user to select at least one member of a displayed list. Methods may include displaying a list alongside the image of the co-mingled document. A user may reference the image before selecting at least one of member of a displayed list.

Methods may include receiving a selected member of a first displayed list. Methods may include receiving a selected member of a second displayed list. In response to receiving one or more user selections, methods may include registering a credit of a selected payment amount to a selected customer account number. The one or more user selections may verify information extracted from a co-mingled document.

Methods may include processing co-mingled correspondence. The correspondence may include a document. Methods may include performing a first extracting of MICR line information printed on the co-mingled document. The MICR line information may be extracted from a digital image of the co-mingled document. The methods may include performing a first extracting of scan line information printed on the co-mingled document. The scan line information may be extracted from a digital image of the co-mingled document.

Methods may include verifying that the extracted MICR line information corresponds to the extracted scan line information. When the extracted MICR line information corresponds to the extracted scan line information, the extracted information may be associated with a first threshold of reliability. Methods may further process the digital image (such as selecting one or more scan templates) based on the first threshold of reliability.

In response to verifying the extracted information, methods may include selecting a set of target areas within the co-mingled document/image. The set of target areas may include a location of the MICR line and a location of the scan line.

Methods may include extracting from the target areas a customer account number and/or a payment amount. Methods may include comparing an extracted customer account number to at least a portion of the extracted MICR line information. The methods may include comparing the extracted customer account number to at least a portion of the extracted scan line information. Comparing an extracted customer account number to the extracted MICR line information and to the extracted scan line information may determine a level of reliability for the extracted customer account.

Methods may include calculating a confidence score. The confidence score may represent a level of reliability associated with extracted information. The confidence score may gauge reliability of extracted information relative to information extracted from other pieces of co-mingled correspondence. When the confidence score exceeds a threshold confidence score, methods may include registering a credit of an extracted payment amount to an extracted customer account number. The payment may be registered to the customer account number when the extracted customer account number is as associated with a threshold level of reliability.

In some embodiments, the entity may rely on the confidence score to associate a penalty with a customer account number. For example, a co-mingled document may be received at a central location. The co-mingled document may be assigned a time/date stamped when received at the central location. The time/date stamp may be later than a due date extracted from the co-mingled document. When the confidence score exceeds a threshold confidence score, a penalty for late payment may be associated with the customer account number extracted from the co-mingled document.

A threshold confidence score for assigning a penalty may be different from a threshold confidence score for crediting a payment. For example, assigning a penalty may require a greater level of confidence/reliability than a level of confidence to credit an extracted payment to the extracted customer account number.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus. Apparatus and methods may involve the use of any suitable combination of elements, components, method steps, computer-executable instructions, or computer-readable data structures disclosed herein.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a computing device 101 (alternatively referred to herein as a "server or computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to orient co-mingled correspondence, scan co-mingled correspondence, select scan templates, extract information from co-mingled correspondence, compute confidence scores and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
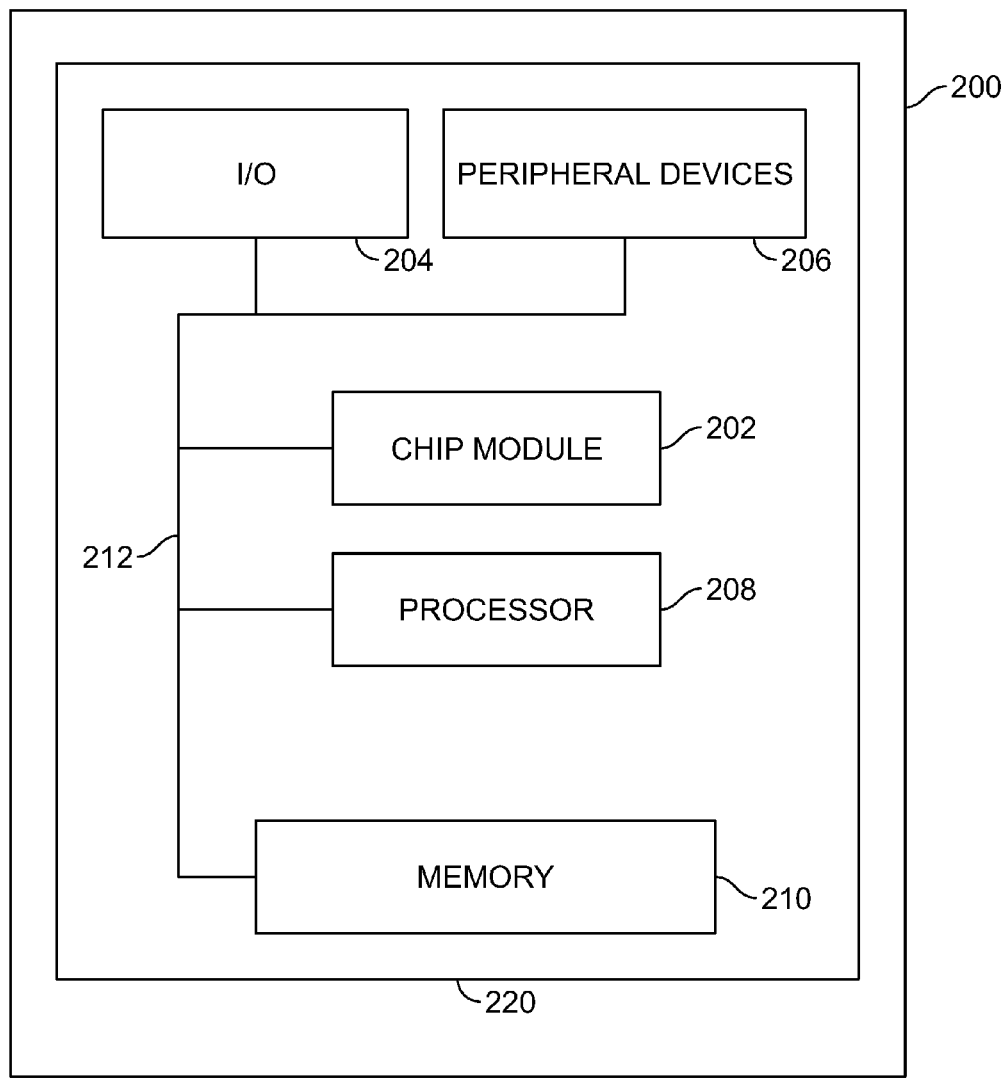
FIG. 2 shows an illustrative apparatus in accordance with the principles of the invention.

FIG. 2 shows an illustrative apparatus that may be configured in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: exception reports, rules tables, lexical items tables, computer code and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
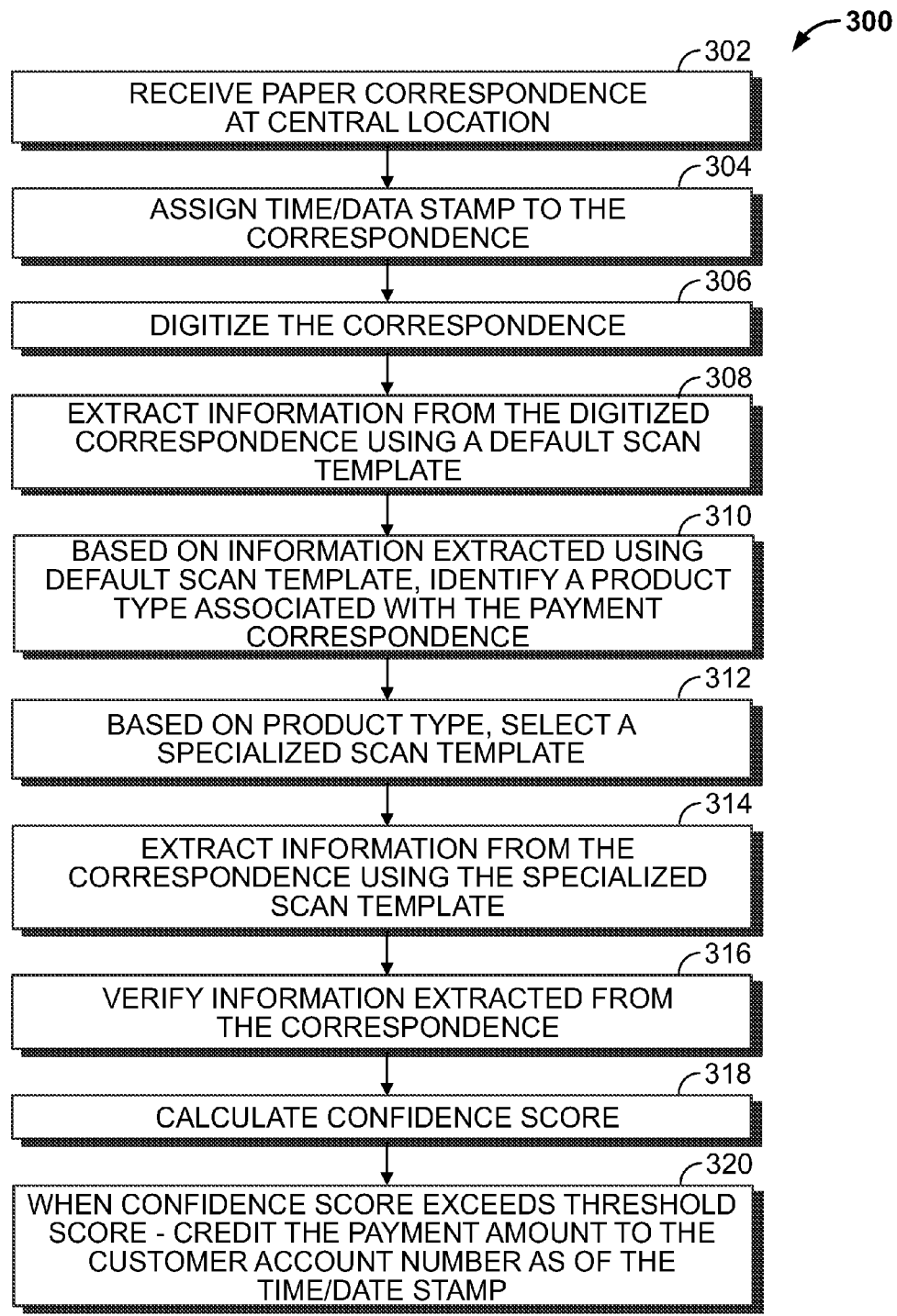
FIG. 3 shows an illustrative process in accordance with the principles of the invention.

FIG. 3 shows illustrative process 300. For the sake of illustration, one or more of the steps of the process illustrated in FIG. 3 will be described as being performed by a "system." The "system" may include one or more of the features of the apparatus or processes shown in FIGS. 1-2 and/or any other suitable device or approach. The "system" may be provided by an entity.

Process 300 may begin at step 302. At step 302, the system receives payment correspondence at a central location. At step 304, the system assigns a time/data stamp to the received correspondence. At step 306, the system digitizes the correspondence. At step 308, the system extracts information from a digital image of the correspondence using a default scan template. The extracted information may include a payment amount, a customer account number or any other suitable information. In some embodiments, default scan template may be used to extract information concurrently with the digitizing of the correspondence. At step 310, based on information extracted using the default template, the system identifies a product type associated with the payment correspondence.

At step 312, based on the product type, the system selects a specialized scan template. At step 314, the system extracts information from the correspondence using the specialized scan template. The specialized scan template may be optimized to extract information from correspondence having a format associated with the identified product type. The information extracted using the specialized scan template may include a second scan the information extracted using the default scan template.

At step 316, the system verifies information extracted from the correspondence. The system may verify the extracted information by comparing information extracted using the default scan template to information extracted using the specialized scan template.

At step 318, the system calculates a confidence score. The confidence score may correspond to a level of reliability or accurateness of information extracted from the correspondence. At step 320, when confidence score exceeds threshold score, the system credits the payment amount to the customer account number as of the time/date stamp.

Figure 4:
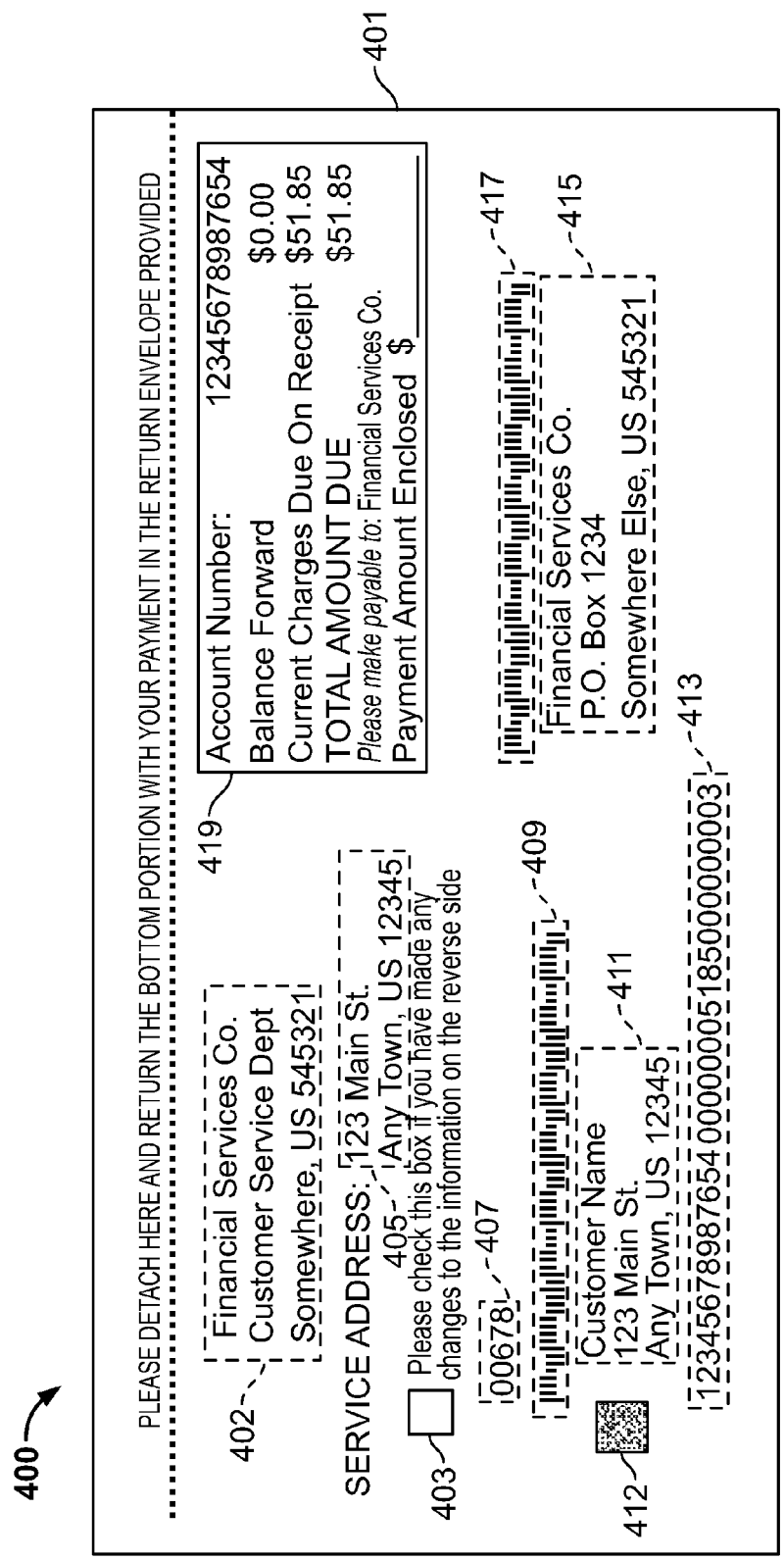
FIG. 4 shows illustrative correspondence in accordance with the principles of the invention.

FIG. 4 shows illustrative correspondence 400. Correspondence 400 may be a remit coupon transmitted to a customer. An entity may transmit correspondence 400 to the customer in response to use of entity supplied products by the customer. Correspondence 400 may be received at a central location. Correspondence 400 may be co-mingled with other correspondence received at the central location. Correspondence 400 may be scanned at the central location. A digital image of correspondence 400 may be co-mingled with digital images of other correspondence received at the central location.

Correspondence 400 includes multiple target areas 401-419. Each of the target areas includes information that may be extracted by applying one or more scanning templates. Based on the information extracted from correspondence 400, the entity may, without human intervention, identify the correspondence and perform one or more actions. The one or more actions may include crediting a payment amount to a customer account number. The one or more actions may include levying a penalty.

Correspondence 400 includes target area 401. Target area 401 includes a plurality of target areas. Target area 401 may correspond to a remit coupon. The remit coupon may be attached to or otherwise part of a document. A default scan template may be configured to perform a scan target area 401. Based on the scan of target area 401, the default scan template may be configured to identify target areas within target area 401. Based on the scan of target area 401, the default scan template may be configured to identify a product type associate with correspondence 400.

For example, a default scan template may be configured to detect and extract information from MICR line 413, scan line 409, scan line 417 and/or Quick Response ("QR") code 412. Based on the extracted information, correspondence 400 may be associated with a product type. Based on the product type, a specialized scan template may be selected. The specialized scan template may be configured to identify and extract information from the target areas within target area 401.

Illustrative information that may be extracted from correspondence 400 is shown below in Table 2. One or more of the target areas may be scanned multiple times. Two or more target areas may include duplicate information. Different sources of duplicate information may be utilized to verify information extracted from correspondence 400. The different sources of duplicate information may be utilized to calculate a confidence score for the information extracted from correspondence 400.

TABLE 2

Illustrative target areas and extracted information.

| Target Area | Information Type | Illustrative Information Extracted from Target Area |
|---|---|---|
| 402 | Entity Address | Financial Services Co. Customer Service Dept. Somewhere, US 545321 |
| 403 | QR code | Any suitable information (i.e., Product Type, Customer address, Payment Amount, Customer Account Number) |
| 405 | Customer Address | 123 Main St. Any Town, US 12345 |
| 407 | Correspondence ID | "00678" |
| 409 | Scan Line No. 1 | Customer Name and Address |
| 411 | Customer Address | Customer Name 123 Main St. Any Town, US 12345 |
| 413 | MICR Line | "1234567898765" (Customer Account Number) "400000" (Product ID) 005185000000" (Total Amount Due) "003" (Correspondence ID) |
| 415 | Entity Remittance Address | Financial Services Co. P.O. Box 1234 Somewhere Else, US 545321 |
| 417 | Scan Line No. 2 | Entity Remittance Address |
| 419 | Amount Due Block | "12345678987654," "$0.00," "$51.85," "$51.85" |

A target area may include one or more "sub" target areas. For example, target area 419 may include a plurality of sub target areas. Each of "Account Number," "Balance Forward," "Current Charges Due On Receipt," "TOTAL AMOUNT DUE" and "Payment Amount Enclosed" may each be identified as a distinct target area.

Figure 5:
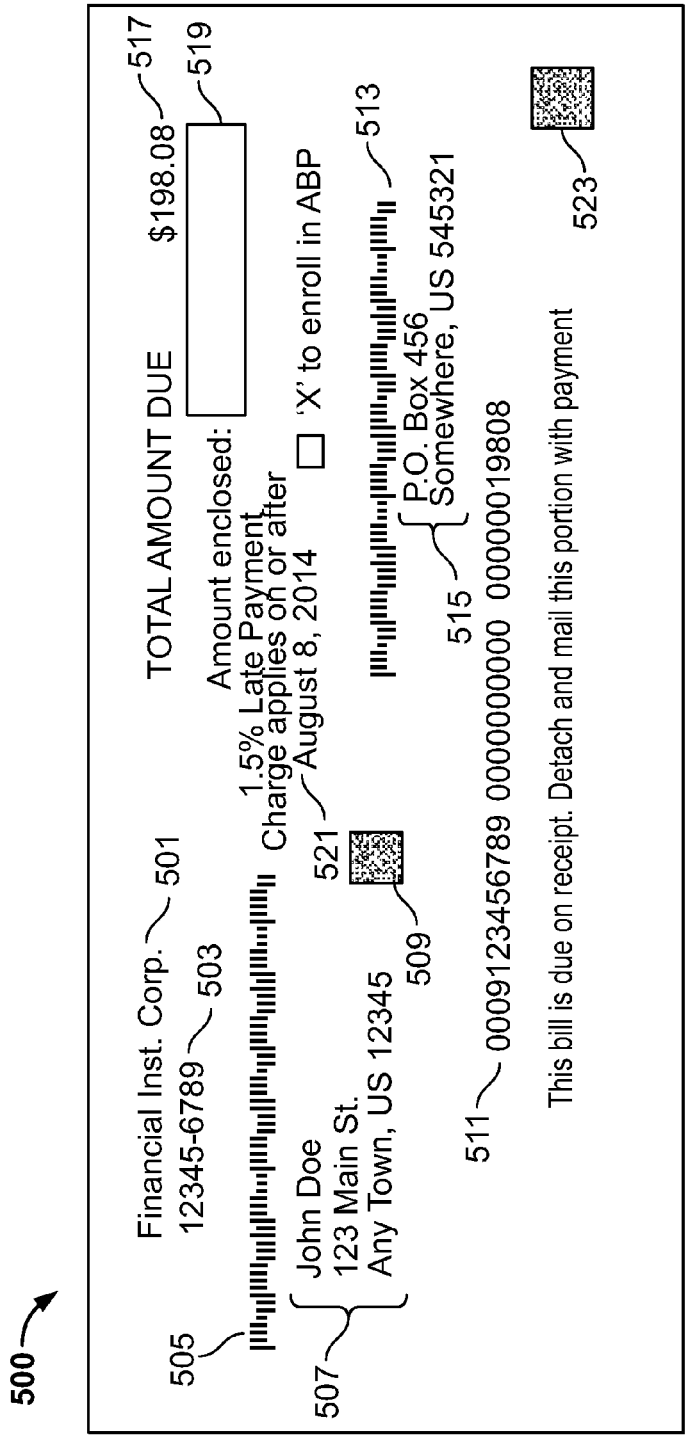
FIG. 5 shows illustrative correspondence in accordance with the principles of the invention.

FIG. 5 shows illustrative correspondence 500. Correspondence 500 may be a remit coupon transmitted to a customer. Correspondence 500 may be associated with a product type that is different from a product type associated with correspondence 400 (shown in FIG. 4). Correspondence 600 may include target areas that are located in different positions from target areas associated with correspondence 400. A first specialized scan template may be configured to extract information from correspondence 400. A second specialized scan template may be configured to extract information from correspondence 500. Each specialized scan template may be configured to identify specific target areas within a correspondence.

FIG. 5 shows that correspondence 500 includes multiple target areas 501-523. A specialized scan template may be configured to identify each of the multiple target areas and extract information from each of the target areas. Target area 501 includes an entity name. Target area 503 includes a customer account number. Target area 505 includes a first scan line. First scan line 505 may include the same information included in target area 507. Information extracted from target areas 505 and 507 may be used verify a customer name and address.

Target area 509 includes a first QR code. Target area 523 includes a second QR code. A QR code may include some or all of the information printed within another target area of correspondence 500. A QR code may be more accurately read by a machine, such as an Opex Eagle device, that processes correspondence 500.

Target area 511 includes a MICR line. The MICR line may include may include some or all of the information printed within another target area of correspondence 500. For example, a portion of the MICR line includes "123456789" corresponding to the customer account number printed within target area 503. A portion of the MICR line includes "000000019808" corresponding to $198.08, the total amount due printed within target area 517.

Target area 513 includes a second scan line. Second scan line 513 may include the same information included in target area 515. Information extracted from target areas 513 and 515 may be used verify an accuracy of an extracted address.

Target area 521 includes a due date for payment. If correspondence 500 is received at a central location after the due date, a penalty may be imposed.

Target area 519 includes a field for a customer to handwrite an entry. A specialized scan template may be configured to identify target area 519 and extract any information entered within the target area.

Figure 6:
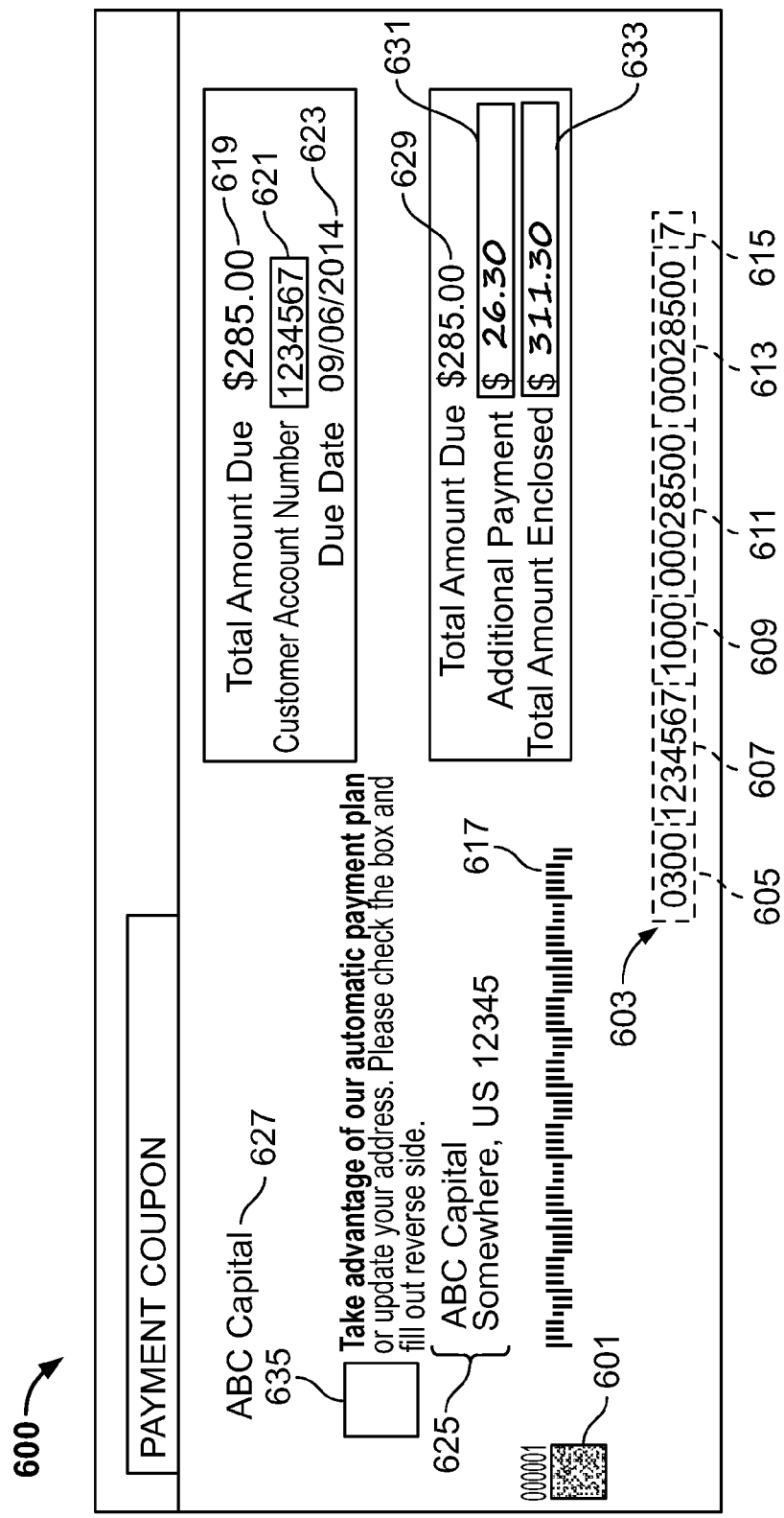
FIG. 6 shows illustrative correspondence in accordance with the principles of the invention.

FIG. 6 shows illustrative correspondence 600. Correspondence 600 may be co-mingled with correspondence 400 (shown in FIG. 4) and correspondence 500 (shown in FIG. 5). Correspondence 600 may be associated with a product type that is different from a product type associated with correspondence 400 or 500. Correspondence 600 may include target areas that are located in different positions from target areas associated with correspondence 400 or 500. Upon receipt at a central location a default scan template may be applied to correspondence 400, 500 and 600.

The default scan template may direct one or more scanners to extract information from within target areas. A default scan template may configure a scanner or other machinery, such as an Opex Eagle device, to extract information from one or more target areas common across correspondence 400, 500 and 600. For example, FIG. 6 shows illustrative target areas 601-635 associated with correspondence 600. FIG. 7A shows illustrative information that may be extracted from at least some of the target areas shown in FIG. 6 using the default scan template.

FIG. 7A shows that using a default scan template, a product code (printed at target area 609) may be extracted. Based on the product code a first specialized scan template may be selected. A specialized scan template may configure a scanner or other machinery, such as an Opex Eagle device, to extract information specific to correspondence associated with the product type.

For example, FIG. 7B shows illustrative information that may be extracted from correspondence 600 using a first specialized scan template. Using a scan template specialized for a specific product code or type may increase an accuracy of information extracted from correspondence 600. Information extracted using a default scan template may be compared to information extracted using a specialized scan template. The comparing may determine a level of confidence or confidence score associated with extracted information.

For example, both the default scan template and a specialized scan template may be configured to extract a customer account number from multiple target areas within correspondence 600. A customer account number may be printed within target areas 601, 603, 617 and/or 621. Each extracted instance of the customer account number may be compared to one or more other extracted customer account numbers. Any discrepancy between the extracted customer account numbers may lower a confidence score associated with the information extracted from correspondence 600.

FIG. 6 shows that correspondence 600 includes target areas 631, 633 and/or 635. Target areas 631, 633 and/or 635 may include handwritten alphanumeric characters. For example, a customer may indicate on co-mingled correspondence that a partial payment (of a total amount due) is being made.

Target areas 631, 633 and/or 635 may be identified based on the product code extracted from target area 609. Based on the product code, a second specialized scan template may be used to extract information from target areas 631, 633 and/or 635. The second specialized scan template may configure a scanner or other machinery, such as an Opex Eagle device, to extract handwritten information from within target areas 631, 633 and/or 635.

FIG. 7B shows illustrative information that may be extracted from target areas 631, 633 and/or 635 of correspondence 600. FIG. 7B shows that if no information is entered by a customer into target area 635, the entity may not enroll the customer in an automated bill pay program.

Figure 8:
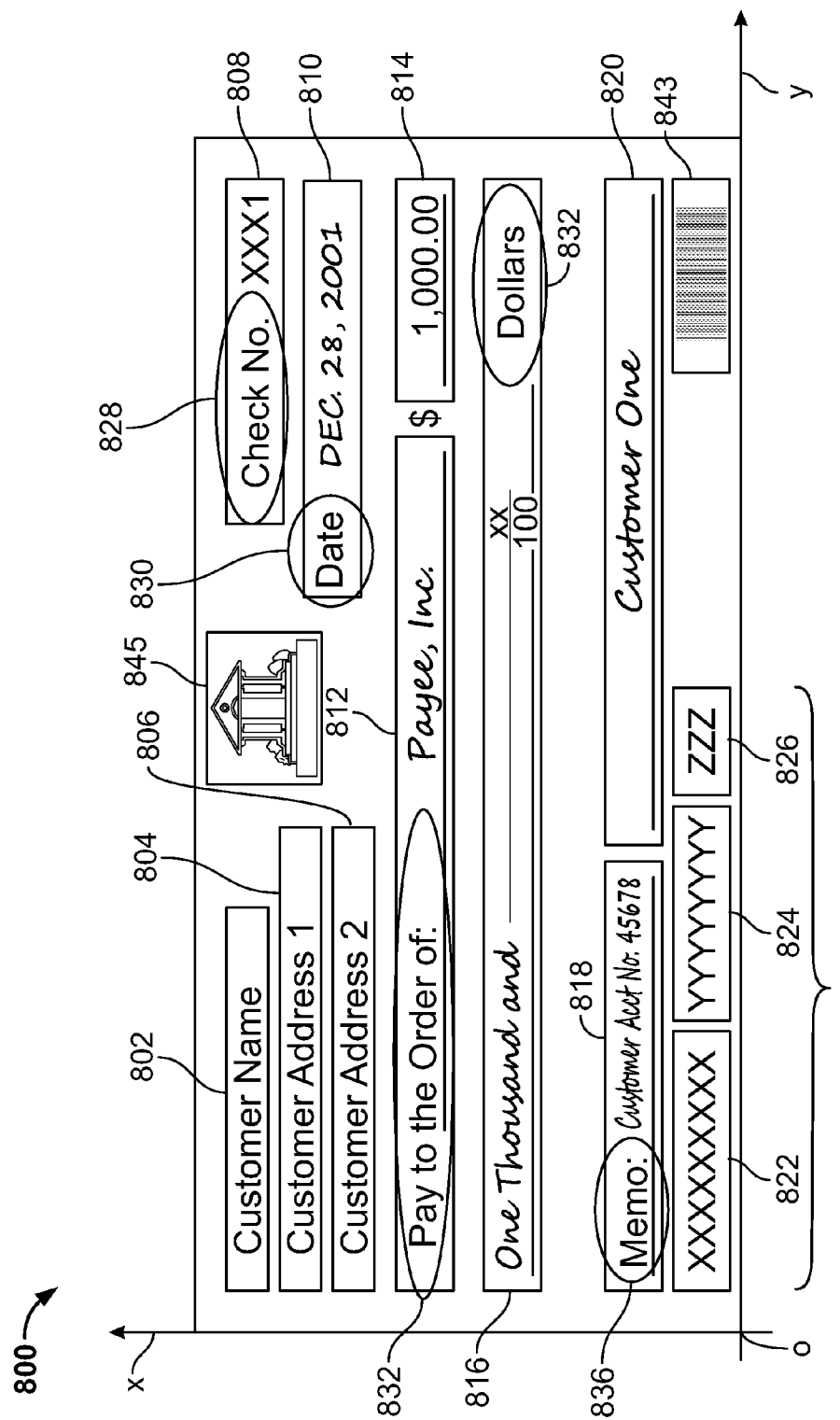
FIG. 8 shows illustrative correspondence in accordance with the principles of the invention.

FIG. 8 shows an illustrative digital image 800 of an exemplary non-entity-issued correspondence.

Digital image 800 may include one or more target areas. One or more of the target areas may be completed by a handwritten entry. Each of the one or more target areas may be completed by a printed entry. Handwriting may include cursive or script information written by hand or printed by machine. Printed character text may be block-style letters that are written by hand or printed by machine in any or a plurality of fonts.

For example, a check issued by an individual-customer may be completed by hand-writing. A check issued by an entity or commercial customer may be printed. A check may include a mix of printed and handwritten entries. For example, a check issued by a commercial entity may include printed MICR line and a handwritten signature.

Each field of image 800 may correspond to information that may be included on non-entity-issued correspondence such as a check. In FIG. 8, a target area may drawer name 802, drawer address 8 804, drawer address 2 806, check number 808, date 810, payee 812, amount 814, dollars 816, comment 818, drawer signature 820, routing number 822, account number field 824, check number field 826 and any other suitable segments.

Information extracted from a target area may be utilized to associate a non-entity-issued correspondence with an entity issued account. For example, a customer may include an entity issued customer account number in target area 818. Apparatus and methods may detect and extract the customer account number. As a further example, apparatus and methods may Apparatus and methods may detect and extract a bank account number within MICR line 841.

Apparatus and methods may detect and extract associate non-entity-issued correspondence 800 with an extracted customer account number and/or bank account number. The associating may include crediting a payment amount indicated in target areas 816 and/or 814 to the customer account number.

Image 800 may include one or more labels. Each label may correspond to a type of information that is printed within a target area. For example, check image 800 may include one or more of "check number" label 828, "date" label 830, "pay-to-the-order-of" label 832, "dollars" label 834, "memo" label 836 and any other suitable labels.

Information extracted from co-mingled correspondence using a scan template may be stored in a transaction record. The transaction record may include information extracted from the digital image of co-mingled correspondence. The transaction record may include information obtained directly from a tangible or "hard copy" of a negotiable instrument. Illustrative information extracted from co-mingled correspondence is shown above in FIGS. 7A-7C.

FIG. 9 shows illustrative transaction record 900. Transaction record 900 may include one or more fields such as check number 902, account identifier 904, payee 906, payee family 908, check date 910, check amount 912, dollars 914, comment 916, comment family 918, signature 920, scan location 922 and machine readable identifier 923. Machine readable identifier 923 may include bar coded information.

Each of the fields may correspond to a target area of a check. The transaction record may include one or more labels that identify a target area. For example, transaction record may include "DATE," "PAY TO THE ORDER OF," "DOLLARS," "MEMO" and any other suitable labels.

Table 3 shows illustrative transaction record fields, illustrative corresponding check target areas and illustrative corresponding target area identifiers.

TABLE 3 illustrative transaction record fields, illustrative corresponding check target areas and illustrative corresponding target area identifiers.

| Illustrative transaction record fields (FIG. 9 reference numeral) | Illustrative corresponding check target areas (FIG. 8 reference numeral) | Illustrative corresponding form target area identifiers (FIG 8 reference numerals) |
| --- | --- | --- |
| Check number (902) | Check number target area (808) | CHECK NO. (828) |
| | Check number target area (826) | |
| Account identifier (904) | Customer name target area (802) | |
| | Customer address 1 target area (804) | |
| | Customer address 2 target area (806) | |
| | Routing number target area (822) | |
| | Account number target area (824) | |
| Payee (906) | Payee target area (812) | PAY TO THE ORDER OF (832) |
| Payee family (908) | Payee target area (812) | PAY TO THE ORDER OF (832) |
| Check date (910) | Date target area (810) | DATE (830) |
| Check amount (912) | Amount target area (814) | |
| Dollars (914) | Dollars target area (816) | DOLLARS (834) |
| Comment (916) | Comment target area (818) | MEMO (836) |
| Comment family (918) | Comment target area (818) | MEMO (836) |
| Signature (920) | Signature target area (820) | |
| Bar Code (923) | Bar Code target area (843) | |

The generating of the transaction record may include extracting information from the digital image. The extracted information may include a drawer's signature on the check.

An illustrative method for extracting information from a digital image may include identifying an origin "O" of illustrative digital image 800. Origin "O" may be identified as a location on check image 800 from which to quantify the relative locations of the segments. For example, origin O may be coincident with the lower left corner of a check upon which check image 800 is based. Axis "x" may run along an edge of the check. For example, axis x may run along the lower edge of the check. Axis "y" may be orthogonal to axis x and may run along an edge of the check. For example, axis y may run along the side edge of the check. Locations of each of the segments may be quantified by coordinates based on the x- and y-axes.

For example, the location of a target area may be quantified as the coordinates of four corners of a rectangle. Any other suitable scheme for quantifying segment locations may be used.

Generating the transaction record may include generating text data. The text data may be generated based on information extracted from the digital image. The text data may be generated based on a handwritten segment of the check. The text data may be generated based on information printed on the check.

Generating the transaction record may include converting a signature from a handwritten entry into text. The converting may be performed by a processor. The processor may be further configured to run an application that translates content of a segment from handwriting to estimated block text. The application may be any suitable application.

In some embodiments, a scanner may not be able decipher information printed within a target area. Apparatus and methods may include displaying the target area and requesting that a selection or "roping" of a portion of a digital image. The roping may direct a scan template to be applied to a selected portion of the digital image.

For example, a check may include a non-standard position of a target area. A roping of a snippet of a digital image of the check may focus the scanning template on a more specific portion of the digital image. As a further example, a check may have been mis-positioned while generating a digital image of the check. As a result of the mis-positioning, a scanning template may be unable to extract information from a target area. Roping of a snippet of the digital image may direct the scanning template to the mis-positioned target area.

Thus, apparatus and methods for processing of co-mingled paper correspondence have been provided. Persons skilled in the art will appreciate that the present invention can be practiced by other than the described embodiments, which are presented for purposes of illustration rather than of limitation. The present invention is limited only by the claims that follow.

What is claimed is:

1. An apparatus for sorting co-mingled paper remittance correspondence, the apparatus comprising:
   conveyor belts for orienting the paper correspondence;
   a scanner;
   a computer system comprising a non-transitory computer-readable medium storing computer-executable instructions which, when executed by a processor on the computer system, configure the apparatus, for each co-mingled image to:
   associate a first electronic scan template with each co-mingled image;
   perform a first electronic scan of the co-mingled image using the first electronic template, the first electronic scan for extracting a first set of printed characters from within each co-mingled image, the first set of printed characters comprising:
   a customer account number; and
   a payment amount;
   based on the first set of printed characters extracted from the co-mingled image, classify the co-mingled image as corresponding to one of a plurality of product types;
   select a second electronic scan template based on the one of the plurality of product types;
   perform a second electronic scan of the co-mingled image using the second template, the second electronic scan for extracting a second set of printed characters from within each co-mingled image;
   based on the second set of printed characters extracted from the co-mingled image, confirming:
   the customer account number; and
   the payment amount; and
   in response to confirming the customer account number and the payment amount, register a credit of the payment amount to the customer account number.

2. The apparatus of claim 1 wherein:
   the first electronic scan template comprises:
   a first target area within the co-mingled image; and
   a second target area within the co-mingled image; and
   the first set of printed characters comprises:
   first information extracted from a MICR line located at the first target area; and
   second information extracted from a scan line located at the second target area.

3. The apparatus of claim 1 wherein the second electronic scan comprises optical character recognition of the first set of printed characters.

4. The apparatus of claim 2 further configured to:
   compare the first information extracted from the MICR line to the second information extracted from the scan line;
   verify that the first information and the second information comprise an identical customer account number; and
   classify the co-mingled image as the one of the plurality of products based on the identical customer account number.

5. The apparatus of claim 1, wherein, in response to a failure of the second set of printed characters to confirm the customer account number, the apparatus is further configured to:
   determine whether the first set of printed characters or the second set of printed characters comprises a valid customer account number;
   in response to detecting the valid customer account number, classify the co-mingled image as the one of the plurality of products based on the valid customer account number;
   determine whether the valid customer account number is associated with a threshold number of payments corresponding to the payment amount; and
   register the credit of the payment amount to the valid customer account number when the valid customer account number is associated with the threshold number of payments corresponding to the payment amount.

6. The apparatus of claim 1 further configured to:
   in response to a failure to classify the co-mingled image as the one of the plurality of products, classify the co-mingled image as a check;
   in response to classifying the co-mingled image as the check:
   select a third electronic scan template; and
   perform a third electronic scan of the co-mingled image using the third electronic scan template to decipher alphanumeric characters printed on the check.

7. The apparatus of claim 1 further configured to:
   in response to classifying the co-mingled image as the one of the plurality of products, receive a target area of the co-mingled image, the target area associated with the one of the plurality of products; and
   identify characters within the target area using a third electronic scan template.

8. The apparatus of claim 7 wherein the third electronic scan template is configured to identify, within the target area, characters printed in multiple fonts.

9. A remittance processing system for extracting information from co-mingled paper correspondence received by an entity, the remittance processing system comprising a non-transitory computer-readable medium storing computer-executable instructions which, when executed by a processor on a computer system configure the remittance system to perform a method for processing the co-mingled paper correspondence, the method comprising:
   removing a document from an envelope;
   orienting the document;
   generating a digital image of the document;
   applying a first scan template to the digital image of the document, the first scan template configured to extract:
      MICR line information printed on the document; and
      scan line information printed on the document;
      based on the MICR line information and the scan line information obtained as a result of applying the first scan template, associating the document with a product of the entity;
      based on the product, associating the document with a second scan template;
   applying the second scan template to the digital image of the document, the second scan template configured to extract:
      a customer name printed on the document;
      a payment amount printed on the document;
      a customer account number printed on the document;
      the MICR line information; and
      the scan line information;
   calculating a confidence score based on correlating the result of the applying of the first scan template to the result of the applying the second scan template; and
   registering a credit of the payment amount to the customer account number when the confidence score exceeds a threshold score.

10. The method of claim 9 further comprising:
   measuring dimensions of the envelope that contains the document;
   determining, based on the dimensions of the envelope, whether the document is an entity-issued document or a non-entity-issued document;
   when the document is the entity-issued document, applying the first and second scan templates to the document; and
   when the document is the non-entity-issued document, applying a third scan template to the digital image of the document, the third scan template configured to:
      extract from the digital image of the document:
         the customer name printed on the document;
         the payment amount printed on the document; and
         at least a portion of a bank account number printed on the document;
      verifying that the customer name is associated with, at least the portion of the bank account number;
      determining the customer account number associated with:
         the customer name;
         the payment amount; and
         at least the portion of the bank account number; and
      registering the credit of the payment amount to the customer account number for the non-entity-issued document.

11. The method of claim 10 further comprising:
   generating a digital image of the envelope;
   using the digital image of the envelope, extracting information printed on the envelope; and
   verifying the customer account number based, at least in part, on the information extracted from the digital image of the envelope.

12. The method of claim 9 wherein the dimensions of the envelope comprise:
   a weight;
   a length;
   a width; and
   a thickness.

13. The method of claim 9 further comprising:
   detecting whether a metal fastener is enclosed within the envelope; and
   in response to detecting the metal fastener, applying the third scan template to the document.

14. The method of claim 9 wherein the product of the entity is one of:
   a credit card;
   a mortgage; and
   a line-of-credit.

15. The method of claim 9 wherein the applying of the second scan template to the digital image of the document comprises:
   identifying a plurality of targets within the digital image of the document, each of the plurality of targets defining an area of the digital image; and
   for each of the plurality of targets, extracting information printed on the document within the area of the digital image defined by the target.

16. The method of claim 15 further comprising:
   extracting the MICR line information from a first target;
   extracting the scan line information from a second target; and
   prior to registering the credit of the payment amount to the customer account number:
      verifying that the MICR line information extracted from the first target corresponds to the MICR line information extracted as a result of applying the first scan template; and
      verifying that the scan line information extracted from the second target corresponds to the scan line information extracted as a result of applying the first scan template.

17. The method of claim 9, wherein the second scan template comprises:
   based on the dimensions of the envelope, selecting a plurality of targets within the digital image of the document, each of the plurality of targets defining an area of the digital image;
   extracting information from each of the defined areas; and
   based on the information extracted from each of the defined areas, determining:
      the customer name;
      at least a portion of the customer account number; and
      the payment amount.

18. The method of claim 17 further comprising:
   based on at least the portion of the customer account number, determining a complete customer account number;
   verifying that the complete customer account number is associated with the customer name;
   determining whether the complete customer account number is associated with a threshold number of payments within a pre-determined percentage of the payment amount or a pre-determined absolute value of the payment amount; and
   registering the credit of the payment amount to the complete customer account number when the complete customer account number is associated with the threshold number of payments.

19. The method of claim 9 further comprising:
based on the information extracted by the first scan template and the information extracted by the second scan template, generating:
a first list of customer account numbers; and
a second list of payment amounts;
receiving a selected member of the first list and a selected member of the second list; and
in response to the receiving, registering the credit of the selected payment amount to the selected customer account number.

20. The method of claim 9 wherein the confidence score is based on:
calculating a first confidence score based on:
comparing the MICR line information extracted in response to applying the first scan template to the MICR line information extracted in response to applying the second scan template; and
comparing the MICR line information extracted in response to applying the first scan template to the customer account number extracted in response to applying the second scan template;
calculating a second confidence score based on:
comparing the scan line information extracted in response to applying the first scan template to the scan line information extracted in response to applying the second scan template; and
comparing the scan line information extracted in response to applying the first scan template to the customer account number extracted in response to applying the second scan template; and
calculating a third confidence score based on determining whether the customer name is associated with the customer account number.

21. A remittance processing system for extracting information from co-mingled paper correspondence received by an entity, the remittance processing system comprising a non-transitory computer-readable medium storing computer-executable instructions which, when executed by a processor on a computer system configure the remittance system to perform a method for processing the co-mingled paper correspondence, the method comprising:
performing a first extracting of MICR line information printed on the co-mingled correspondence;
performing a first extracting of scan line information printed on the co-mingled correspondence;
verifying that the MICR line information corresponds to the scan line information;
in response to the verifying, selecting a set of target areas within a digital image of the co-mingled correspondence, the set of target areas comprising a location of the MICR line and a location of the scan line;
extracting, from the target areas of the digital image:
a customer account number; and
a payment amount;
comparing the customer account number:
to the MICR line information; and
to the scan line information;
calculating a confidence score based on the comparing; and
when the confidence score exceeds a threshold score, registering a credit of the payment amount to the customer account number.

* * * * *